United States Patent [19]

Anderson et al.

[11] Patent Number: 4,829,828
[45] Date of Patent: May 16, 1989

[54] PRESSURE TRANSDUCER

[75] Inventors: Thomas T. Anderson, Downers Grove; Conard J. Roop, Lockport; Kenneth J. Schmidt, Midlothian; Elmer R. Gunchin, Lockport, all of Ill.

[73] Assignee: The United States of America as represented by the United States Department of Energy, Washington, D.C.

[21] Appl. No.: 14,551

[22] Filed: Feb. 13, 1987

[51] Int. Cl.$^4$ ............................ G01L 7/08; G01L 9/10
[52] U.S. Cl. ........................................ 73/728; 336/30
[58] Field of Search .................... 73/722, 728; 336/30

[56] References Cited

U.S. PATENT DOCUMENTS 2,510,073  6/1950  Clara ...................................... 73/722

OTHER PUBLICATIONS

Yancy, "Design and Evaluation of a Pressure Sensor for High Temperature Nuclear Application", EGRG Idaho, Inc. published Nov. 1981, 33 pages.

Primary Examiner—Donald O. Woodiel
Attorney, Agent, or Firm—Gustavo Siller, Jr.; Paul A. Gottlieb; Judson R. Hightower

[57] ABSTRACT

A pressure transducer suitable for use in high temperature environments includes two pairs of induction coils, each pair being bifilarly wound together, and each pair of coils connected as opposite arms of a four arm circuit; an electrically conductive target moveably positioned between the coil pairs and connected to a diaphragm such that deflection of the diaphragm causes axial movement of the target and an unbalance in the bridge output.

19 Claims, 5 Drawing Sheets

PRESSURE TRANSDUCER

CONTRACTUAL ORIGIN OF THE INVENTION

The United States Government has rights in this invention pursuant to Contract No. W-31-l09-ENG-38 between the U.S. Department of Energy and the University of Chicago representing Argonne National Laboratory.

BACKGROUND OF THE INVENTION

This invention relates generally to pressure transducers, and more particularly to pressure transducers of the electromagnetic induction type.

A pressure transducer is a device which converts pressure, as detected by the mechanical deflection of a diaphragm, into an electrical output. A typical pressure transducer of the induction type couples the mechanical deflection of the diaphragm to a moveable target which is positioned near a coil. The movement of the target, which is formed of an electrically conductive material or of a magnetic material, causes the inductance of the coil to change. When the coil is connected as the arm of a bridge circuit, the change in inductance of the coil causes a bridge unbalance or output signal which is then used to determine pressure.

A variation of this device places two coils and two targets in a housing with the diaphragm at an end of the housing, as described in U.S. Pat. No. 2,614,244, issued to E. B. Moss et al. Each target is associated with one of the coils. One target is fixed in relation to the other target and each is moveably coupled to the diaphragm. The two coils are connected as adjacent arms of a four arm bridge circuit. While the two coil arrangement is an improvement over the one coil arrangement, this device has two major drawbacks. First, the output of the two coil system is low. Second, temperature compensation is difficult in high temperature environments since only two of the four bridge arms are in the high temperature environment. High temperature environments also limit the target to an electrically conductive material, since magnetic materials become unstable at high temperatures.

It is therefore an object of the present invention to provide a pressure transducer with improved output over large ranges of pressure and temperature.

It is another object of the present invention to provide a pressure transducer suitable for use in high temperature environments.

Additional objects, advantages, and novel features of the present invention will be set forth in part in the description which follows, and in part will become apparent to those skilled in the art upon examination of the following or may be learned by practice of the invention.

SUMMARY OF THE INVENTION

To achieve the foregoing objects and in accordance with the purposes of the present invention, a pressure transducer may comprise a four arm circuit having an input branch and an output branch. Opposite arms of the four arm circuit are bifilarly wound together forming two pairs of induction coils. An electrically conductive target is mounted between the first and second pairs of induction coils. The target is connected to a diaphragm which is deflected in response to variations in pressure. Means are provided for supplying an AC excitation signal to the input branch and for detecting the output signal across the output branch generated in response to deflections in the diaphragm and the excitation signal.

BRIEF DESCRIPTION OF THE DRAWINGS

The present invention is illustrated in the accompanying drawings wherein.

DETAILED DESCRIPTION OF THE INVENTION

Figure 1:
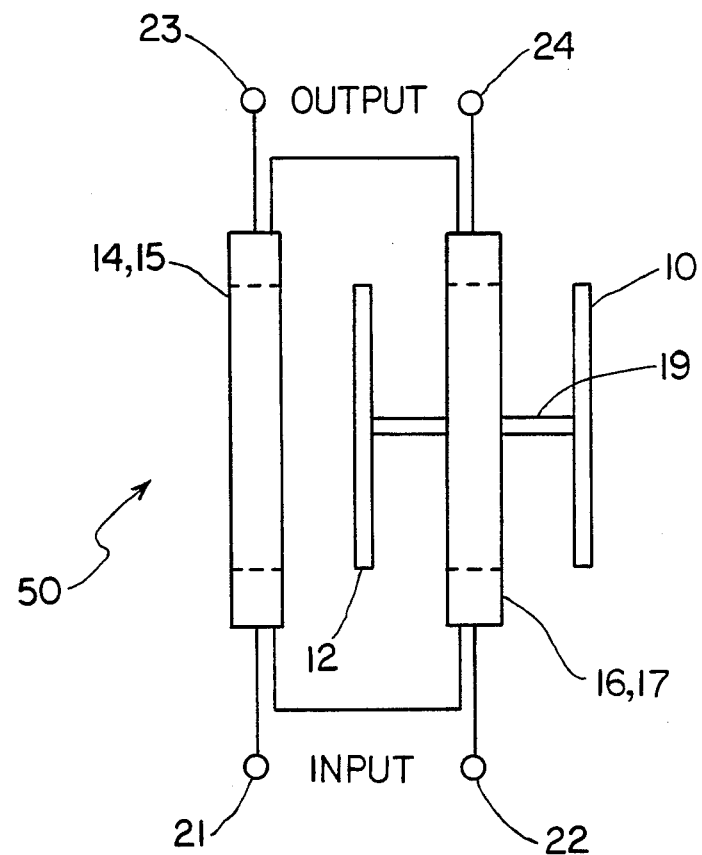
FIG. 1 is a schematic of the pressure transducer of the present invention.
Figure 2:
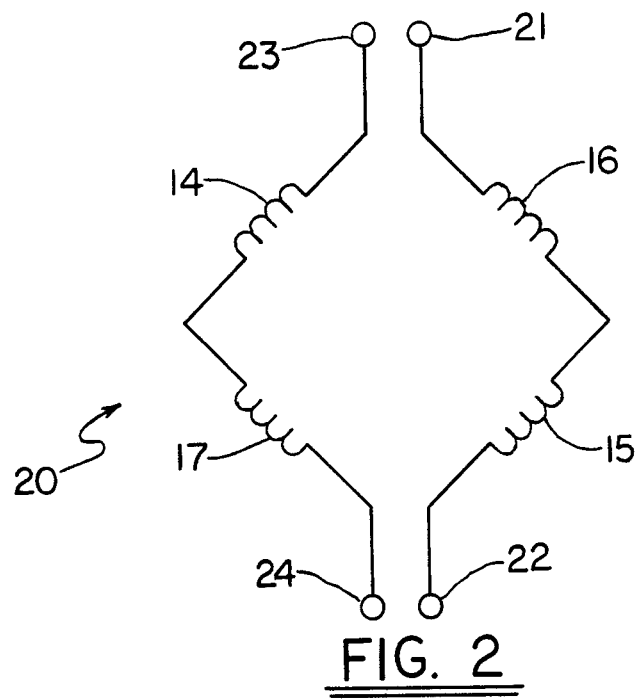
FIG. 2 shows a two arm active bridge input circuit and a two arm isolated bridge output circuit.

FIGS. 1 and 2 show the general relationship of the elements of a preferred embodiment of the present invention. Diaphragm 10 of pressure transducer 50 is connected to electrically conductive target 12 by rod 19. Deflection of diaphragm 10 causes target 12 to move between inductive coil pairs 14, 15 and 16, 17. Each pair is bifilarly wound together. FIG. 2 shows the position of each individual coil as it is connected in circuit 20. Terminals 21 and 22 are the input branch, which is comprised of a two arm active bridge circuit, where the AC excitation signal is applied (AC source not shown). Terminals 23 and 24 are the output branch, which is comprised of an isolated two arm bridge circuit, where the output signal generated in response to the input signal is measured.

Coil 15, the first arm of the two arm active bridge circuit, is bifilarly wound to coil 14, the opposite arm of the two arm bridge output circuit. Coil 16, the second arm of the two arm active bridge circuit is bifilarly wound to coil 17, the opposite arm of the two arm bridge output circuit.

Figure 3:
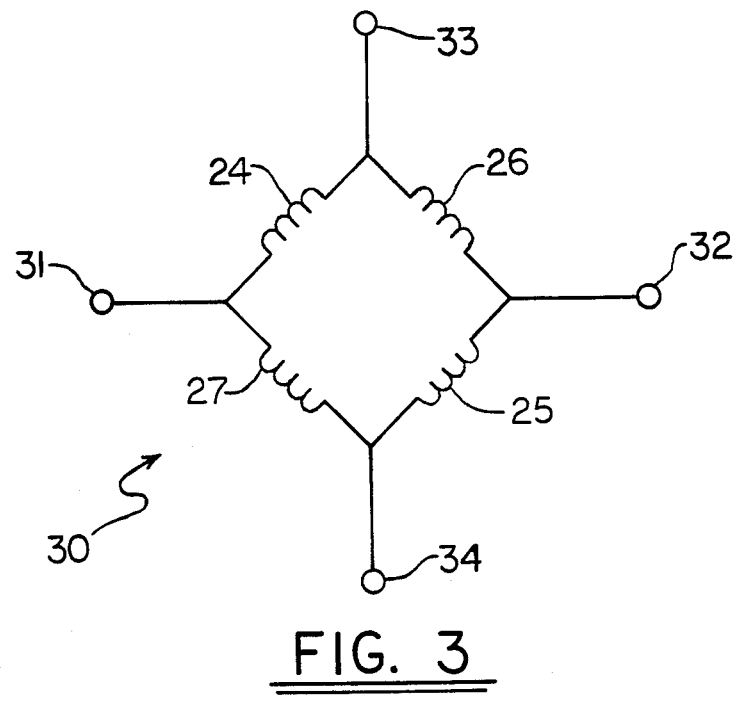
FIG. 3 shows the four arm bridge connection.

FIG. 3 shows another preferred embodiment of the four arm circuit of the present invention. Four arm bridge circuit 30 is comprised of coil pairs 24, 25, 26 and 27, each coil pair being bifilarly wound together. Terminals 31 and 32 are the input terminals where an AC excitation signal is applied. Terminals 33 and 34 are the output terminals where an output signal is generated in response to the input signal. Coils 24 and 25 are opposite bridge arms, as are coils 26 and 27. Each bridge arm is an active arm.

Figure 4:
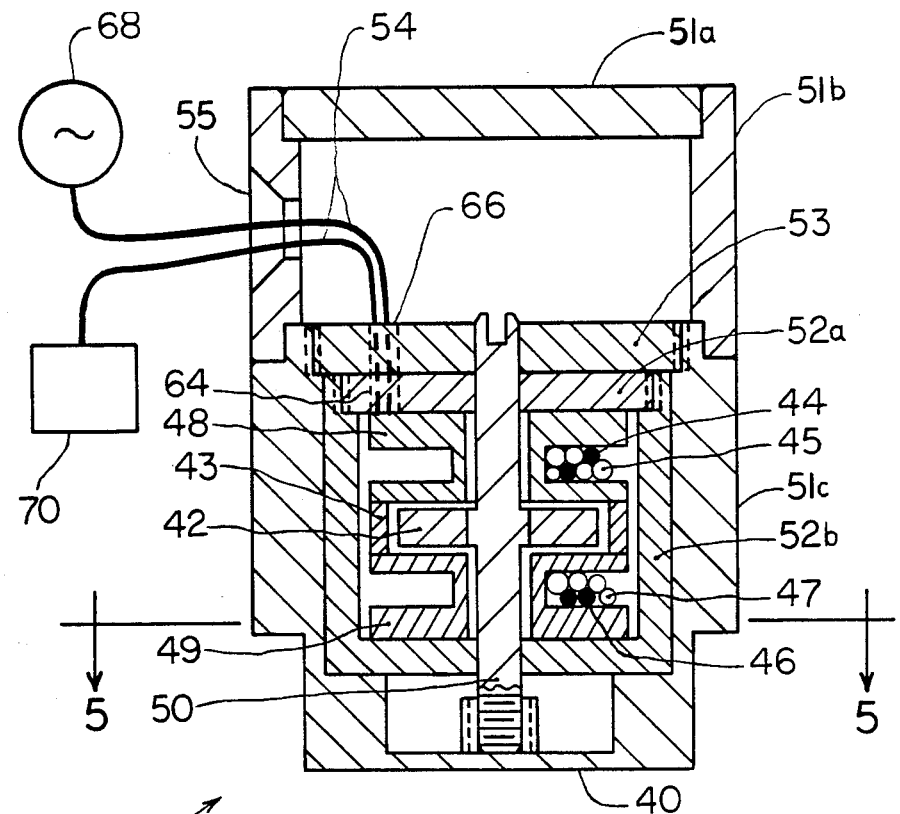
FIG. 4 is a section of an enclosed pressure transducer.
Figure 5:
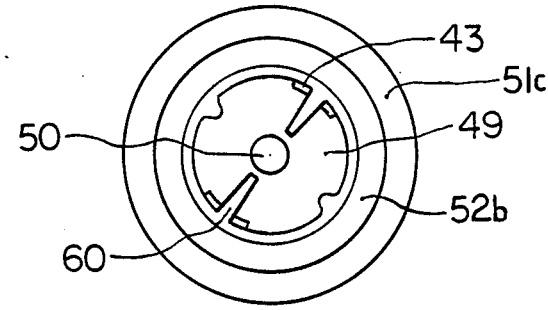
FIG. 5 is a cross section through line 5—5 of FIG. 4.

FIGS. 4 and 5 show another embodiment of the pressure transducer of the present invention. Pressure transducer 80 includes outer case 51 which includes case top 51a, upper case 51b, middle and lower case 51c. Inner case shield 52 which includes inner case top 52a and inner case 52b. The bottom of case 51 forms diaphragm 40. Diaphragm 40 is connected via pushrod 50 to target 42. Target 42 is positioned between coil pairs 44, 45 and 46, 47 wrapped around spools 48 and 49 respectively. Spacer 43 is provided to restrict movement of target 42 in the plane perpendicular to pushrod 50, the direction of travel. Coil pairs 44, 45 and 46, 47 are bifilarly wound together and connected in a four-arm circuit similar to that in FIG. 2. It will be readily apparent to those skilled in the art, coil pairs 44, 45, and 46, 47 may also be connected in the four-arm bridge circuit shown in FIG. 3.

Lead wires 54 are the connections between the bridge input and output circuits and AC excitation means 68 and output detecting means 70. The wires are connected via slot 60 in spool 49, a similar slot provided in spool 48 (not shown), hole 64 in inner lid 52a, hole 66 in retaining ring 53, and hole 55 in outer case 51b.

Coils 44–47 have identical number of windings. This winding scheme and the fact that all coils are subject to the same temperature minimizes temperature compensation. The planar construction of the coils in FIG. 4 (both are planes perpendicular to the axis of travel) minimizes thermal gradient and transients.

Target 42 acts as the sensing element. Induced electrical current in the target is reflected back to the currents in the individual coil windings. An axial displacement produces an unbalance in the bridge resulting in a net output signal. In the four arm circuit shown in FIG. 2 the unbalance is multiplied by a factor of two: mutual inductance from unbalance in the active arms appears as a signal in the isolated arms. In the four arm bridge circuit shown in FIG. 3 the coils are mounted as opposite pairs, the unbalance is multiplied by a factor of eight: unbalance in four active arms plus mutual inductance in four active arms.

Depth of penetration of eddy currents induced in the target depends on target thickness, frequency of the excitation signal, and electrical conductivity. A target formed of copper and having a thickness of 1/16 inch at 100 kHz produced constant signal sensitivity versus displacement despite decreasing electrical conductivity with increasing temperature. A 50% copper -50% nickel alloy has essentially constant conductivity with temperature. A target made of this copper-nickel alloy with a 1/16 inch thickness produced a decrease in sensitivity to only half that with the copper target. However, in extreme environments the Monel target has better resistance to oxidation.

Figure 6:
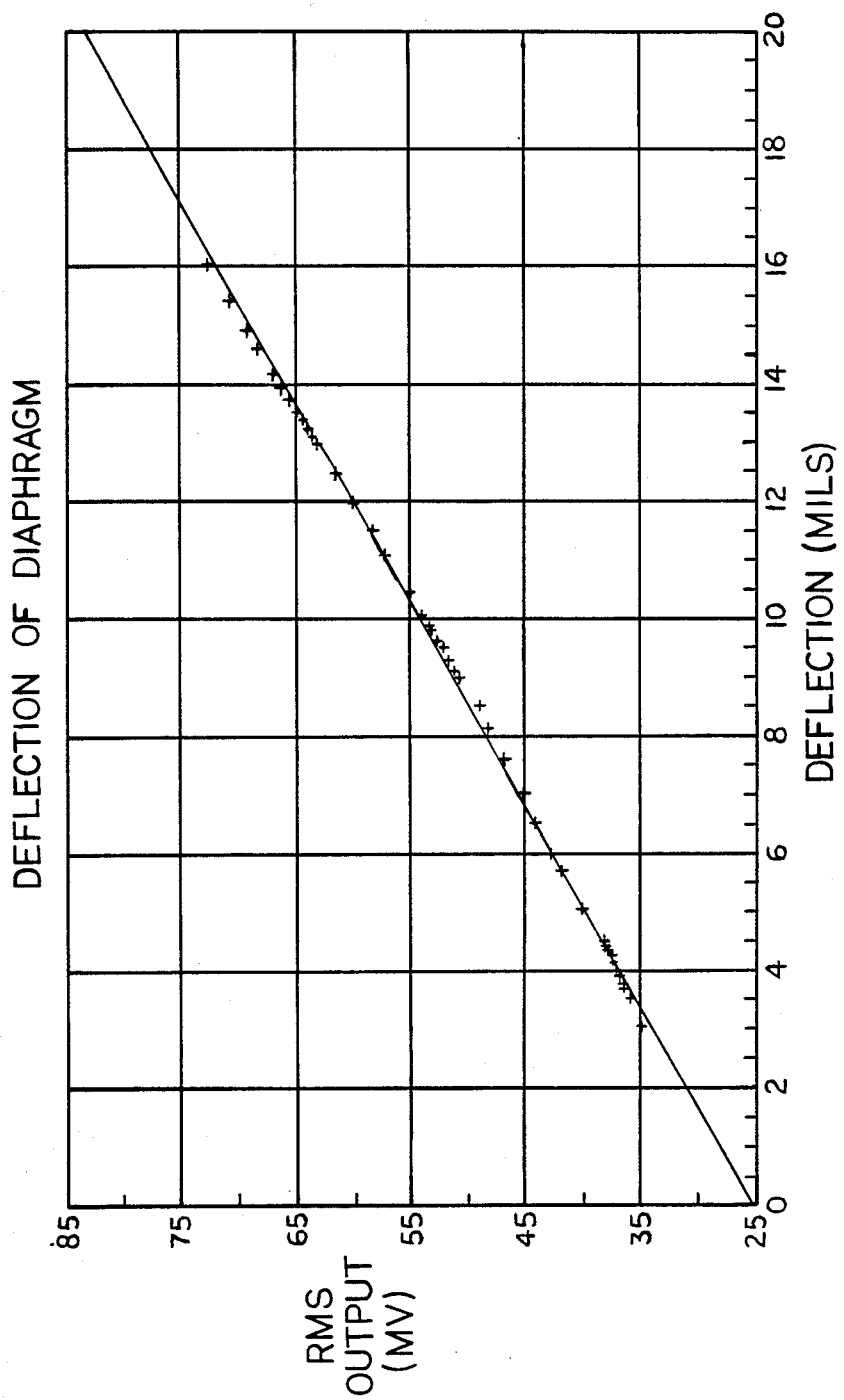
FIG. 6 is a graph of RMS output versus deflection of the diaphragm for the transducer in FIG. 4 with the four arm bridge circuit of FIG. 3.
Figure 7:
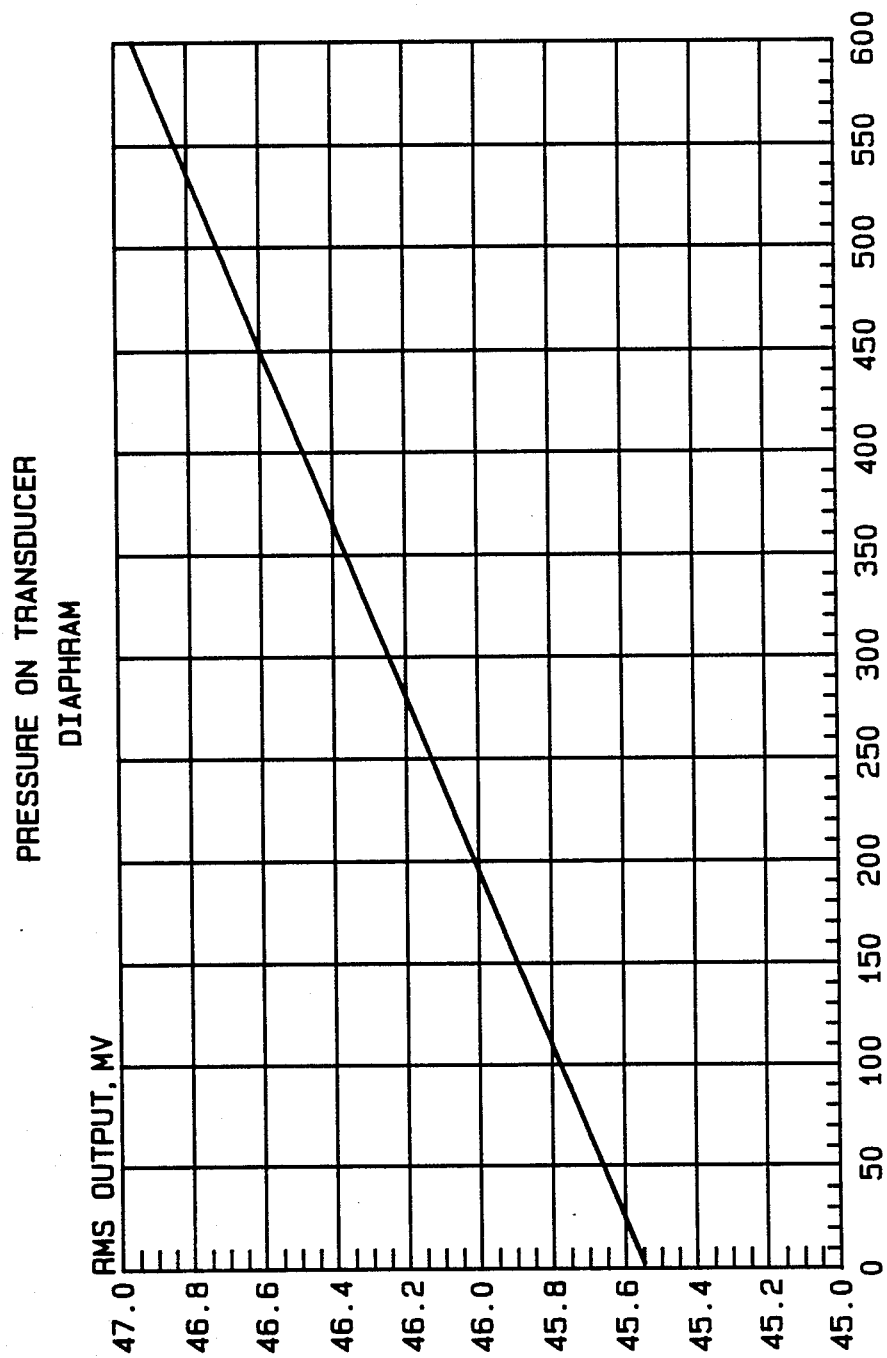
FIG. 7 is a graph of RMS output versus pressure for the transducer in FIG. 4 with the four arm bridge circuit of FIG. 3.

FIG. 6 shows the response and sensitivity of the pressure transducer of FIG. 5 with the four-arm bridge circuit shown in FIG. 3. For a 0.7 mil deflection of the diaphragm at 600 psi full range, the output using the Monel target is 1.5 millivolts RMS for a 3 volt excitation signal at 70 kHz. As can be seen from FIG. 7, the AC output signal, when amplified and converted to RMS, varies linearly in voltage with diaphragm deflection. This linear relationship is independent of temperature and input frequencies. A range of from 10–100 kHz is useful for the present invention using the four arm bridge circuit shown in FIG. 3. A range of 100–300 kHz is useful for the pressure transducer of the present invention with the four arm circuit shown in FIG. 2.

Referring again to the embodiment of FIG. 4, since the pressure transducer is contemplated for use in high temperature environments and in electrically conductive media (such as liquid sodium), a better output signal is obtained when the coils are shielded from the effects of the medium and temperature interactions with the case.

Case 51 is shown as pieces 51a through 51d. Case 51 is usually formed of a material which does not have a constant electrical conductivity with temperature. To compensate for this (and for the effects of an electrically conductive medium, if any) shield 52 is provided. Shield 52 is shown as an inner cylindrically symmetrical can which is positioned between the coils and the case. Shield 52 is formed of a material which has a relatively constant electrical conductivity with temperature, such as a 50% copper - 50% nickel alloy. Shield 52 provides electromagnetic shielding from eddy currents produced by the return field in the coils.

The foregoing description of a preferred embodiments of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A pressure transducer comprising:
 (a) a diaphragm which is capable of being deflected in response to variations in pressure;
 (b) an electrically conductive target;
 (c) means for mounting said target such that said target is responsive to deflections of said diaphragm;
 (d) bifilarly wound inductive coil means for generating an output signal in response to deflections of said target and an excitation signal;
 (e) means for applying an AC excitation signal to said bifilarly wound inductive coil means; and
 (f) means for detecting said output signal generated by said bifilarly wound inductive coil means.

2. The pressure transducer of claim 1 wherein said bifilarly wound inductive coil means comprises an input branch having a first two arm bridge circuit and an output branch having a second two arm bridge circuit, the first arm of said input branch circuit and the second arm of said output branch circuit bifilarly wound together forming a first pair of induction coils, the second arm of said input branch circuit and the first arm of said output branch circuit bifilarly wound together forming a second pair of induction coils and wherein said target is mounted between said first and second pairs of induction coils.

3. The pressure transducer of claim 2 wherein all four induction coils have identical windings.

4. The pressure transducer of claim 2 wherein said electrically conductive target is formed of copper.

5. The pressure transducer of claim 2 wherein said electrically conductive target is formed essentially of a 50% copper - 50% nickel alloy.

6. The pressure transducer of claim 2 wherein said means for applying an AC excitation signal is operable to generate a signal having a frequency of from 100–300 kHz.

7. The pressure transducer of claim 2 further comprising a case enclosing said transducer elements and connected to said diaphragm.

8. The pressure transducer of claim 7 further comprising a spacer positioned about said target for restricting the movement of said target between said pairs of induction coils.

9. The pressure transducer of claim 8 wherein said mounting means comprises a pushrod connected between said diaphragm and said target.

10. The pressure transducer of claim 9 further comprising an electromagnetic shield positioned between said case and said coil pairs, said shield being formed of a material having substantially constant electrical conductivity with temperature.

11. The pressure transducer of claim 1 wherein said bifilarly wound inductive coil means comprises a four arm bridge circuit having an input branch and an output branch, the first and third arms of said bridge circuit bifilary wound together forming a first pair of induction coils, the second and fourth arms of said bridge circuit bifilarly wound together forming a second pair of induction coils and wherein said target is mounted between said first and second pairs of induction coils.

12. The pressure transducer of claim 11 wherein all four induction coils have identical windings.

13. The pressure transducer of claim 11 wherein said means for applying an AC excitation signal is operable to generate a signal having a frequency of from 10-100 kHz.

14. A pressure transducer comprising:
(a) an input branch having a first two arm bridge circuit;
(b) an output branch having a second two arm bridge circuit, the first arm of said input branch circuit and the second arm of said output branch circuit bifilarly wound together forming a first pair of induction coils and the second arm of said input branch circuit and the first arm of said output branch circuit bifilarly wound together forming a second pair of induction coils;
(c) a diaphragm which is capable of being deflected in response to variations in pressure;
(d) an electrically conductive target;
(e) means for mounting said target between said first and second pairs of induction coils, said target being responsive to deflections of said diaphragm;
(f) means for applying an AC excitation signal to said input branch; and
(g) means for detecting an output signal across the output branch, said output signal generated in response to a deflection of said target and said excitation signal, whereby the pressure at said diaphragm is detected.

15. The pressure transducer of claim 14 wherein all four induction coils have identical windings.

16. The pressure transducer of claim 14 wherein said means for applying an AC excitation signal is operable to generate a signal having a frequency of from 100-300 kHz.

17. A pressure transducer comprising:
(a) a four arm bridge circuit having an input branch and an output branch wherein the first and third arms of said bridge circuit are bifilarly wound together forming a first pair of induction coils and the second and fourth arms of said bridge circuit are bifilarly wound together forming a second pair of induction coils;
(b) a diaphragm which is capable of being deflected in response to variations in pressure;
(c) an electrically conductive target;
(d) means for mounting said target between said first and second pairs of induction coils, said target being responsive to deflections of said diaphragm;
(e) means for applying an AC excitation signal to said input branch; and
(f) means for detecting an output signal across the output branch, said output signal generated in response to a deflection of said target and said excitation signal, whereby the pressure at said diaphragm is detected.

18. The pressure transducer of claim 17 wherein all four induction coils have identical windings.

19. The pressure transducer of claim 18 wherein said means for applying an AC excitation signal is operable to generate a signal having a frequency of from 10-100 kHz.

* * * * *